Oct. 4, 1955 E. M. FRANKLIN 2,719,325
METHOD AND APPARATUS FOR MIXING PLASTIC COMPOSITIONS
Filed Dec. 13, 1951
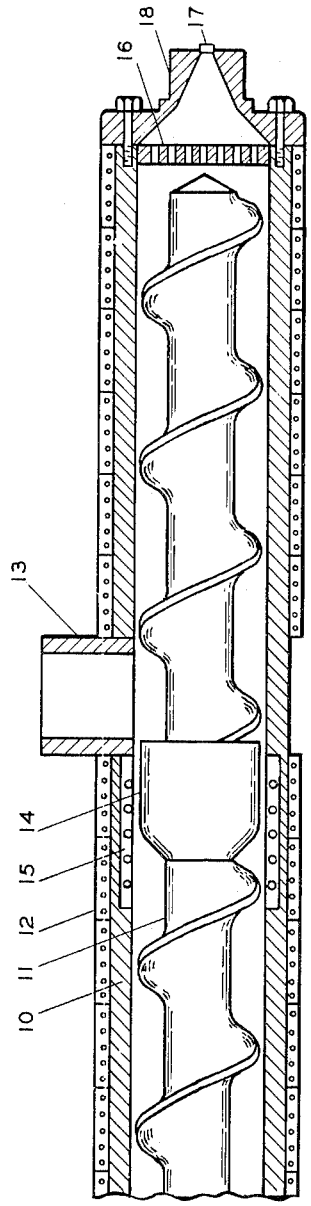
ERNEST M. FRANKLIN,
INVENTOR.
BY Ernest G. Peterson
AGENT.

United States Patent Office 2,719,325
Patented Oct. 4, 1955

2,719,325

METHOD AND APPARATUS FOR MIXING PLASTIC COMPOSITIONS

Ernest M. Franklin, Stelton, N. J., assignor to Hercules Powder Company, Wilmington, Del., a corporation of Delaware Application December 13, 1951, Serial No. 261,420

8 Claims. (Cl. 18—12)

This invention relates to an improved method and apparatus for extruding plastic materials. In a particular aspect this invention relates to an improved method and apparatus for plasticating, mixing and homogenizing thermoplastic compositions.

Various means have been employed to blend thermoplastic materials with such modifying agents as plasticizers, lubricants, pigments or dyes, and the like. The procedures employed have often required the use of machines such as dry mixers, compounding rolls, various types of kneaders or masticators and other machines. To overcome the problems inherent in the use of such a variety of machines, continuous extruders were developed to mix and blend the thermoplastic materials with the modifying agents. These extruders ordinarily did not provide the desired blending and mixing in a single pass, and consequently, multiple-pass treatments were required in the mixing and blending operation. In order to improve the extrusion procedure in such a way that the mixing and blending could be effected in a single pass through the extruder, a special type of worm was devised wherein a substantial portion of the worm was designed in the form of an elongated cylindrical torpedo. This type of device improved upon the mixing and blending that were effected in the extruder, but the extruder itself provided no means for removing easily volatilized substances, such as water and low boiling solvents, which tend to cause porosity, bubbles, blisters, and similar defects in the extruded product. Consequently, it was necessary to dry the thermoplastic material and modifying agents prior to introduction to the extruder in order to obtain a satisfactory product from the extruder. Such drying operations are time consuming and they add to the production costs of the extruded material. The desirability and utility of an apparatus and an improved method for extruding plastic materials with modifying agents wherein the substances of high volatility are removed during the extrusion operation and wherein no predrying of the extrusion mix is necessary are obvious from the above discussion.

It is an object of this invention to provide an improved method for blending plastic materials and modifying agents.

It is another object of this invention to provide an apparatus for blending plastic materials and modifying agents and for removing volatile substances during the blending operation.

It is a further object of this invention to provide an improved method and apparatus for blending plastic materials and modifying agents without the necessity for drying the ingredients prior to the blending operation.

Further and additional objects of this invention will be apparent from the detailed disclosure set forth hereinbelow.

The objects and advantages of this invention are accomplished by blending or colloiding the plastic material with modifying agents in a hot screw extruder provided with a vent for removing volatile materials during the extrusion operation. The materials to be blended are introduced to the extruder where they are first partially colloided at an elevated colloiding temperature. The partially colloided material is then passed through a cooled portion of the extruder wherein the screw worm is provided with an elongated cylindrical torpedo. The cooled relatively viscous material is then immediately passed through the vented section of the extruder where volatile substances are removed, and the resulting mixture freed of at least a portion of the volatile substances is then further colloided in a subsequent section of the extruder at an elevated colloiding temperature.

A detailed description of this invention will be supplied by reference to the accompanying drawing which is a longitudinal section through part of the barrel of a plastics extruder showing a feed worm provided with a torpedo section and also showing the vented extruder barrel.

Prior to colloiding the plastic material and modifying agents in the vented extruder of this invention, the ingredients to be colloided are preferably premixed, although in some instances, if desired, the materials to be colloided can be introduced separately to the extruder hopper. The premixing operation can be effected by various means. For example, the plastic material and modifying agents can be introduced to a ribbon mixer where relatively uniform mixing of the ingredients is accomplished. If desired, the plasticizing agents or other modifying compounds can be sprayed onto the plastic material in the ribbon mixer. The coloring or pigmented agents can be dispersed in the plasticizer or, if desired, they can be introduced to the mixture dissolved in a solvent. When solvents thus introduced to the mixture are of the volatile type, such as low boiling alcohols, they can be removed through the vent in the extruder during the colloiding operation.

Prior to this invention it was deemed necessary to subject the premix to a drying operation to remove relatively volatile substances such as water, solvents, and the like from the mixture and thus to exclude defects from the extruded product. The premix contains from 2.5% to 3% and sometimes as much as 6% to 8% moisture as well as various solvents, and it was deemed necessary to reduce the moisture content to not over 0.5% in order to eliminate the defects in the extruded product. Prior to this invention the drying of the premix, in some instances, was effected by passing hot air through the premix for a period of about 30 to 40 minutes. Obviously, such an operation is time consuming and uneconomical. By practicing this invention it is unnecessary to dry the premix prior to its passage into the extruder, and the product resulting from the extrusion operation is substantially free of the defects discussed above.

Referring now to the accompanying drawing for a detailed description of the invention, plastic material and modifying agents are introduced to cylindrical barrel 10 of a horizontal extrusion machine through a hopper (not shown). Barrel 10 is fitted with a rotatable screw worm 11 which is concentrically and axially disposed and which serves to pass the mixture being colloided through the extruder. Barrel 10 is also provided with heating means 12 which is used to provide the necessary heat for the extruding operation. The heating can be effected in any suitable manner such as by electrical heating coils or by suitable jacketing of the extruder barrel and passage of a hot fluid, such as steam, through the jacket. Extruder barrel 10 is also provided with vent 13 for removal of materials volatilized in the extruder barrel during the extruding operation. Screw worm 11 is provided with an elongated cylindrical torpedo 14 having a diameter smaller than the bore of barrel 10 and leaving a clearance of .030 to .250 inch between the two members. The clearance is sufficiently great to permit passage of a thin film of partially colloided material therethrough. The section of barrel 10 wherein torpedo 14 is disposed is provided with cooling means 15 for suitable cooling of the partially colloided material passing through this section of the extruder. The necessary cooling can be effected in any desirable manner, preferably by jacketing this section of barrel 10 and passing water or other suitable cooling fluid through the jacketed section.

As already indicated, the mixture to be colloided is introduced to barrel 10 through a hopper (not shown). If desired, the mixture can be preheated before being introduced to barrel 10. The mixture is then heated to a suitable colloiding temperature in barrel 10 and passed through barrel 10 by screw worm 11. When the partially colloided mixture reaches torpedo 14, the mixture is cooled by cooling means 15 sufficiently to prevent expulsion of partially colloided material through vent 13. The primary purpose of the cooling is to increase the viscosity of the partially colloided mixture to a point where it can withstand the back pressure developed in the extruder, and thus the back pressure is not sufficient to force the partially colloided material out of barrel 10 through vent 13. However, the amount of cooling that is effected is not sufficient to cause condensation of the moisture and other volatile materials volatilized in the initial partial colloiding section of barrel 10. Therefore, as the partially colloided mixture leaves torpedo 14, volatile materials in the mixture are removed therefrom via vent 13. The devolatilized mixture is then again heated and further colloided in the subsequent section of extruder barrel 10 at a colloiding temperature, and the resulting completely colloided mixture is emitted from the extruder barrel through breaker plate 16 and openings 17 in head 18 as a plurality of individual, continuous, cylindrical rods. These rods are substantially free of any of the defects noted in prior art procedures where no predrying of the mixture to be colloided was employed. The rods issuing from the extruder are then cooled, such as by passage through water, and the cooled rods are then disintegrated or comminuted in any desirable manner.

While any suitable thermoplastic composition can be employed in this invention, the extrusion process and apparatus are particularly applicable to the molding of thermoplastic compositions containing organic derivatives of cellulose such as organic esters and ethers of cellulose. Examples of such organic esters of cellulose are cellulose acetate, cellulose propionate, cellulose butyrate, or mixed esters such as cellulose acetate propionate or cellulose acetate butyrate. Examples of the cellulose ethers are ethyl cellulose and benzyl cellulose. Also, if desired, mixed ether-ester derivatives of cellulose can be similarly employed. Other thermoplastic materials which are not derivatives of cellulose can be colloided by practicing this invention. Such other plastic materials as, polyamides, polystyrene, polymerized vinyl and acrylic acid derivatives, such as polymerized vinyl acetate, mixed vinyl chloride and vinyl acetate, methyl methacrylate, and the like, can be used. By "thermoplastic composition" is meant any substance within the generally accepted definition of that term and which can be molded and shaped under heat.

In addition to the plastic material the mixture to be colloided will preferably contain a nonvolatile plasticizing or softening agent such as dimethyl phthalate, diethyl phthalate, the phthalate esters of monomethyl ethers of ethylene glycol and polyglycols, triacetin, mixed esters of glycerol with acetic acid and propionic acid, triphenyl phosphate, and the like, or mixtures of two or more of these compounds in varying proportions. If colored effects are desired in the blended product, pigments, dyes, lakes, or other coloring materials can be added to the mixture to be colloided.

Cellulose acetate is one of the preferred thermoplastic compositions for use in this invention. While several grades of cellulose acetate can be used depending upon the kind of product, type of plasticizer, pigment and the like, it has been found most desirable to use a cellulose acetate with an acetic acid content between about 51% and about 59% to produce a molding powder for use in injection molding procedures. The plasticizers ordinarily used with the cellulose acetate include tributyl phosphate, triphenyl phosphate, dimethyl phthalate, diethyl phthalate, diphenyl phthalate, butyl stearate, various vegetable oil fatty acids such as castor oil fatty acids, fatty alcohols such as lauryl alcohol and the like. Both solvent and nonsolvent plasticizers can be used separately or preferably a mixture of both can be mixed with the cellulose acetate. Various factors control the amount of plasticizer to be used, but for most purposes a quantity between about 15% and about 40% of the total composition is used.

Ethyl cellulose is another preferred thermoplastic material for use in practicing this invention, and it has been found desirable to use an ethyl cellulose with an ethoxy content between about 46.8% and about 48.5%. Any of the above-named plasticizers for use with cellulose acetate can be used with ethyl cellulose, either singly or in mixtures of two or more plasticizers, and the amount of plasticizer to be used is generally within the range of 15% to 40% of the total composition.

The temperature at which the plastic material and modifying agents are colloided in the extruder of this invention is variable and dependent largely upon the compounds being colloided. The colloiding temperatures employed prior to the torpedo or metering zone and also subsequent to that zone are known in the art and in general they fall within the range of 200° to 500° F. The temperature in the torpedo or metering zone is somewhat lower and, as already pointed out, the temperature is such that the viscosity of the partially colloided material can withstand the back pressure of the extruder. However, the temperatures should be sufficiently high to permit the volatile materials to remain in the vapor state. The temperature actually employed in this zone is also dependent upon the materials being colloided, and the temperature that is suitable for any mixture of materials is readily determinable by adjusting the amount of cooling that is effected in the torpedo or metering zone until the desired viscosity of the partially colloided material is attained. By way of example a mixture of finely-divided cellulose acetate and plasticizer was mixed in a ribbon mixer at room temperature. The mixture contained 100 parts by weight of cellulose acetate and 50 parts by weight of diethyl phthalate as plasticizer. This mixture was fed by gravity to an extruder similar to the extruder described in detail above, and the temperature of the extruder at the point at which the mixture was introduced via a hopper was 300° F. The temperature in the compounding zones prior and subsequent to the torpedo or metering zone was 380° F., and the temperature in the metering zone was 280° F. The breaker plate temperature was 400° F., and the temperature in the head of the extruder was 380° F. At these temperatures there was no loss of material through the vent in the barrel, and the extruded product was satisfactorily free of defects normally caused by the presence of volatile material in the feed mixture.

The length of time that the material to be colloided is actually in the extruder barrel is dependent upon such factors as the degree of colloiding desired, the compounds being colloided, the design of the barrel and screw worm, and the like. In general this period varies within the range of 2 to 10 minutes and preferably from 3 to 5 minutes. The particle size of the feed mixture entering the extruder has an effect upon the degree of colloiding that is attained in the extruder, and for all practical purposes the feed mixture should have a particle size such that it is capable of passing a 20-mesh screen. However, it will be understood that in some instances the desired colloiding can be attained with a feed mixture having a somewhat larger particle size. The torpedo is an elongated cylindrical section of the screw worm preferably having a smooth surface, but in some instances a corrugated or uneven surface, such as a surface containing a series of helical grooves, will improve the degree of colloiding that is attained. The longitudinal length of the torpedo is a variable factor, but in most instances the ratio of the length of the torpedo to the length of the extruder barrel is within the range of 1:100 to 1:20.

The extruder of this invention is of the single barrel type employing a single screw worm. The screw flight can be constant throughout the length of the screw worm, excluding the torpedo section of the worm, but in some instances it is desirable to design the screw worm with a flight that becomes steeper as the forward or discharge end of the extruder is approached. By designing the screw worm in this manner, improved mixing and colloiding can be attained. In fact, it is sometimes desirable to design the screw flight to become steeper as the discharge end is approached and then to reverse the screw flight at the forward or discharge end of the extruder. The actual design of the screw worm has an effect upon the back pressure that is developed in the extruder, and accordingly, the design of the screw worm has an effect upon the cooling that must be effected in the torpedo of metering zone in order to prevent loss of partially colloided material through the extruder vent.

Various modifications and alternative modes of operation within the scope of the invention will be readily apparent to those skilled in the art from the above detailed disclosure.

What I claim and desire to protect by Letters Patent is:

1. The method for colloiding a mixture of a plastic material and a modifying agent for said plastic material, said mixture containing a substance volatilizable at the colloiding temperature, which comprises introducing said mixture to an elongated cylindrical barrel containing a screw worm having a cylindrical mixing torpedo in an intermediate section of said screw worm, partially colloiding said mixture in a first portion of said barrel at an elevated temperature, then increasing the viscosity of the mixture thus partially colloided by cooling same in the portion of said barrel containing said mixing torpedo to a temperature at which said volatilizable substance remains in a vapor state, removing at least a portion of said volatilizable substance from said partially colloided mixture by passing same through a vented portion of said barrel, further colloiding the resulting mixture in a subsequent portion of said barrel, said barrel having a substantial back pressure developed in said first portion and said subsequent portion of said barrel.

2. The method according to claim 1 wherein the colloiding temperature is within the range of 200° to 500° F.

3. The method according to claim 1 wherein the plastic material is cellulose acetate.

4. The method according to claim 1 wherein the plastic material is ethyl cellulose.

5. An extruder for colloiding a mixture of a plastic material and a modifying agent for said plastic material which comprises, in combination, an elongated cylindrical barrel, a rotatable screw worm disposed within said barrel, said screw worm containing a cylindrical mixing torpedo in an intermediate section of said screw worm, said barrel containing a vent for removing vapors disposed immediately subsequent to said mixing torpedo in the direction of flow of material through said barrel, means for heating said barrel, means for reducing the temperature of the plastic material in the section of said barrel wherein said torpedo is disposed, and means for developing a substantial back pressure in said barrel disposed between said vent and the discharge end of said barrel.

6. An extruder for colloiding a mixture of a plastic material and a modifying agent for said plastic material which comprises, in combination, an elongated cylindrical barrel, a rotatable screw worm disposed within said barrel, said screw worm containing a cylindrical mixing torpedo, means for reducing the temperature of the plastic material in the section of said barrel wherein said torpedo is disposed, said barrel containing a vent for removing vapors from mixture cooled by said temperature reducing means, means for heating said barrel, and means for developing a substantial back pressure in said barrel disposed between said vent and the discharge end of said barrel.

7. An extruder for colloiding a mixture of a plastic material and a modifying agent for said plastic material which comprises, in combination, an elongated cylindrical barrel, a rotatable screw worm disposed within said barrel, said screw worm containing a cylindrical mixing torpedo having a length within the range of $1/100$ to $1/20$ of the length of said barrel, a breaker plate disposed between the forward end of said screw worm and the discharge end of said barrel, means for reducing the temperature of the plastic material in the section of said barrel wherein said torpedo is disposed, said barrel containing a vent for removing vapors from mixture cooled by said temperature reducing means, and means for heating said barrel.

8. An extruder for colloiding a mixture of a plastic material and a modifying agent for said plastic material which comprises, in combination, an elongated cylindrical barrel, a rotatable screw worm disposed within said barrel, said screw worm containing a cylindrical mixing torpedo having a clearance with said barrel of 0.03 to 0.25 inch and having a length within the range of $1/100$ to $1/20$ of the length of said barrel, a breaker plate disposed between the forward end of said screw worm and the discharge end of said barrel, means for reducing the temperature of the plastic material in the section of said barrel wherein said torpedo is disposed, said barrel containing a vent for removing vapors from mixture cooled by said temperature reducing means, and means for heating said barrel.

References Cited in the file of this patent

UNITED STATES PATENTS

| | | |
|---|---|---|
| 2,519,014 | Bankey | Aug. 15, 1950 |
| 2,595,455 | Heston | May 6, 1952 |